(12) United States Patent
Nagata

(10) Patent No.: US 8,639,298 B2
(45) Date of Patent: Jan. 28, 2014

(54) MOBILE PHONE AND INCOMING ALERTING SYSTEM

(75) Inventor: Takayuki Nagata, Yao (JP)

(73) Assignee: Hosiden Corporation, Osaka (JP)

( * ) Notice: Subject to any disclaimer, the term of this patent is extended or adjusted under 35 U.S.C. 154(b) by 257 days.

(21) Appl. No.: 12/908,315

(22) Filed: Oct. 20, 2010

(65) Prior Publication Data

US 2011/0098086 A1 Apr. 28, 2011

(30) Foreign Application Priority Data

Oct. 23, 2009 (JP) ................................. 2009-244737

(51) Int. Cl.
*H04B 1/38* (2006.01)

(52) U.S. Cl.
USPC .......................... 455/567; 455/557; 348/552

(58) Field of Classification Search
USPC .................. 455/556.1, 556.2, 557–559, 567, 455/418–420; 348/14.01, 14.04, 14.06, 348/14.07, 552–553, 561, 563–565, 569
See application file for complete search history.

(56) References Cited

U.S. PATENT DOCUMENTS

| | | | |
|---|---|---|---|
| 2007/0049255 A1 | 3/2007 | Bhakta et al. | |
| 2008/0084834 A1 | 4/2008 | Stanek | |
| 2009/0251526 A1 | 10/2009 | Book | |
| 2010/0031291 A1* | 2/2010 | Iwata et al. | 725/42 |
| 2010/0064333 A1* | 3/2010 | Blackburn et al. | 725/110 |
| 2010/0073455 A1* | 3/2010 | Iwabuchi et al. | 348/14.04 |
| 2011/0018849 A1* | 1/2011 | Lowe et al. | 345/205 |

FOREIGN PATENT DOCUMENTS

| | | | | | |
|---|---|---|---|---|---|
| JP | 2002084210 A | * | 3/2002 | | H04B 1/54 |
| JP | 2002359670 A | | 12/2002 | | |
| JP | 2003304304 A | | 10/2003 | | |
| JP | 2006-229498 A | | 8/2006 | | |
| JP | 2006-311098 A | | 11/2006 | | |
| JP | 2007-243811 A | | 9/2007 | | |
| JP | 2008109341 A | | 5/2008 | | |
| JP | 2009-071568 A | | 4/2009 | | |

* cited by examiner

*Primary Examiner* — San Htun
*Assistant Examiner* — Magdi Elhag
(74) *Attorney, Agent, or Firm* — The Webb Law Firm

(57) ABSTRACT

To provide a technique for informing the user of the incoming to a mobile phone through an external device such as a television, making use of an interface standardly equipped in the external device even when the power of the external device is off. The mobile phone includes a signal producing section for producing an incoming information signal containing information for informing the user of the incoming to the mobile phone in conformity to the HDMI standards when at least one of voice communication and data communication is received; and an HDMI communication section for outputting the incoming information signal to the external device to communicate with the external device capable of performing signal transmission conformed to the HDMI standards through a signal transmission medium conformed to the HDMI standards.

5 Claims, 3 Drawing Sheets

MOBILE PHONE AND INCOMING ALERTING SYSTEM

CROSS REFERENCE TO RELATED APPLICATIONS

This application is based on and claims priority under 35 U.S.C., Section 119 to Japanese Patent Application No. 2009-244737 filed on Oct. 23, 2009, the entire of content of which is incorporated herein by reference.

FIELD OF THE INVENTION

The present invention relates to a mobile phone for informing the user of the incoming to the mobile phone through an external device, and an incoming alerting system for informing the user of the incoming to the mobile phone.

BACKGROUND OF THE INVENTION

The user of a mobile phone sometimes becomes unaware of an incoming call or electronic mail in a house because it tends to put its mobile phone on a desk or shelf, though it usually carries the mobile phone with it when going out. In view of this, various techniques for informing the user of the incoming to the mobile phone have been proposed. Japanese Unexamined Patent Application Publication No. 2002-359670A discloses in paragraph 0007 an alerting system for transmitting incoming alerting information from a mobile phone having a short-range wireless communication function to a television having the short-range wireless communication function of the same standards as the mobile phone to put necessary display on the television. On the other hand, Japanese Unexamined Patent Application Publication No. 2003-304304A discloses in claim 1 an incoming alerting display device for receiving radio waves transmitted from the mobile phone indicating receipt of an incoming call or electronic mail to the mobile phone to display the information on the television that the call or electronic mail is received.

The device of JP No. 2003-304304A requires that the television be provided with an antenna or receiving circuit for receiving the radio waves transmitted from the mobile phone indicating receipt of the incoming call or electronic mail. On the other hand, the system of JP No. 2002-359670A requires that both the mobile phone and the television have the short-range wireless communication function of the same standards. Further, in both JP No. 2003-304304A and JP No. 2002-359670A, the user is not informed of the incoming call or electronic mail when the power of the television is off because the incoming alert information of the mobile phone is not displayed on the television.

SUMMARY OF THE INVENTION

Having regard to the above-noted background, a technique is required for informing the user of the incoming to the mobile phone through an external device even when the power of the external device is off, making use of an interface standardly equipped in the external device such as a television, for example.

One aspect of a mobile phone in accordance with the present invention that has been made having regard to the above subject matter lies in comprising:

a signal producing section for producing an incoming information signal containing information for informing the user of the incoming to the mobile phone in conformity to the HDMI standards when at least one of voice communication and data communication is received; and an HDMI communication section for communicating with an external device capable of performing signal transmission conformed to the HDMI standards through a signal transmission medium conformed to the HDMI standards and outputting the incoming information signal to the external device.

The HDMI standards acting as an interface for digital devices are generally standardly equipped in the digital AV devices including a digital broadcasting-enabled television. The external device represents a device capable of performing signal transmission conformed to the HDMI standards. The use of the HDMI standards allows an image or sound to be transferred from the mobile phone to the external device in an uncompressed state without providing the external device with any dedicated chip or software such as a decoder. Further, the HDMI standards have an intelligent function for allowing the interconnected devices to recognize each other, which naturally facilitates that the interconnected devices cooperate with each other by a control signal. In addition, the HDMI standards use a single cable for integrating an image signal, audio signal and control signal together, which also facilitates wiring between the devices. Therefore, as seen in the characteristic feature of the present invention, the mobile phone comprises the signal producing section for producing the incoming information signal in conformity to the HDMI standards, and the HDMI communication section for outputting the incoming information signal to the external device, thereby easily informing the user of the incoming to the mobile phone through the external device. More particularly, it is possible to inform the user of the incoming to the mobile phone by making use of the external device without providing any special hardware or software on the external device. As a result, when a call or electronic mail comes in the mobile phone while the user is at home, the user is able to receive the information on the incoming through the external device such as a television without taking up the mobile phone. Further, it is possible to reduce the chance that the user might miss a ringtone from the mobile phone because it has been drown out by the sound from the television or might be unaware of the motion or behavior of the mobile phone set to a vibration mode. Here, the vibration mode represents an operation mode for informing the user of the incoming call or electronic mail by vibrating the mobile phone without sounding the ringtone on the mobile phone. Still further, since the HDMI standards facilitate that the interconnected devices cooperate with each other by the control signal, it is possible to start up the external device through the mobile phone even when the power of the external device is off. As a result, the user is satisfactorily informed of the incoming call or electronic mail to the mobile phone through the external device even when the power of the external device is off.

Here, it is preferable that the external is a television. The television is the most-widespread digital AV device in home appliances that is capable of outputting both the image and the sound and is equipped with the HDMI standards. Further, it is likely that the power of the television is on and the user watches the television when at home. Thus, the effective alert becomes possible.

As noted above, the HDMI standards facilitate that the interconnected devices cooperate with each other, and are capable of starting up the external device even when the power of the external device is off. Thus, it is preferable that the HDMI communication section of the mobile phone according to the present invention transmits a wakeup command for starting up the external device in transmitting the incoming alert information signal when there is no response from the external device within a predetermined period of time. The wakeup command starts up the external device, and the incoming to the mobile phone is properly informed to the user through the external device.

One aspect of an incoming alert system in accordance with the present invention that has been made having regard to the above subject matter lies in that the incoming alert system including a mobile phone and a television connected to each other through a signal transmission medium, the system comprises:

a signal producing section provided in the mobile phone for producing an incoming information signal containing information for informing the user of the incoming to the mobile phone in conformity to the HDMI standards when at least one of voice communication and data communication is received;

a phone-side HDMI communication section provided in the mobile phone for performing bidirectional communication of a CEC signal with the television through the signal transmission medium and outputting the incoming information signal to the television as a TMDS signal;

a television-side HDMI communication section provided in the television for performing bidirectional communication of the CEC signal with the mobile phone through the signal transmission medium and receiving the incoming information signal; and an alerting section provided in the television for alerting the user to the incoming to the mobile phone based on the incoming alert information signal through at least one of a visual alert and an auditory alert.

The HDMI standards acting as an interface for digital devices are generally standardly equipped in the digital AV devices including a digital broadcasting-enabled television. The use of the HDMI standards allows an image or sound to be transferred to the television in an uncompressed state without providing the television with any dedicated chip or software such as a decoder. Further, the HDMI standards have an intelligent function for allowing the interconnected devices to recognize each other, which facilitates that the interconnected devices cooperate with each other by a control signal. In addition, the HDMI standards use a single cable for integrating an image signal, audio signal and control signal together, which also facilitates wiring between the devices. Therefore, as seen in the characteristic feature of the present invention, the mobile phone comprises the signal producing section for producing the incoming information signal in conformity to the HDMI standards, and the HDMI communication section for outputting the incoming information signal to the external device, thereby easily informing the user of the incoming to the mobile phone through the television. More particularly, it is possible to inform the user of the incoming to the mobile phone by making use of the television without providing any special hardware or software on the television. In addition, since the HDMI standards facilitate that the interconnected devices cooperate with each other, it is possible to start up the television through the mobile phone even when the power of the television is off to properly inform the user of the incoming to the mobile phone.

Here, it is preferable that the phone-side HDMI communication section transmits a wakeup command for starting up the television in transmitting the incoming alert information signal when there is no response from the television within a predetermined period of time. The wakeup command starts up the television, and the incoming to the mobile phone is properly informed to the user through the television.

Further, it is preferable that, after transmitting the incoming information signal and informing the user of the incoming to the mobile phone through the television, the phone-side HDMI communication section of the incoming alert system according to the present invention transmits a return command for returning the television to the state before the incoming information signal is transmitted. The television returns quickly to the state where it was after the incoming to the mobile phone is informed, as a result of which the user would not feel annoyed.

Further, in the incoming alert system according to the present invention, it is preferable that the television includes an operational instruction receiving section for receiving an operational instruction including an instruction from a remote controller for the television controllable by the user, the television-side HDMI communication section transmits a message demanding command for demanding transmission of details of the incoming to the mobile phone based on the operational instruction, and the phone-side HDMI communication section transmits the details of the incoming to the mobile phone to the television.

With this arrangement, the user is able to confirm the details of the incoming to the mobile phone without operating the mobile phone while watching the television.

Still further, in the incoming alert system according to the present invention, it is preferable the television-side HDMI communication section transmits a broadcasting discrimination command for indicating at least whether the broadcasting on the television is a main program or commercial, and the phone-side HDMI communication section transmits a command for informing the user of the incoming to the mobile phone in a different mode based on the broadcasting discrimination command.

The user would be disturbed if the screen of the television or sound from the television is automatically switched to indicate the incoming alert information when it watches a TV program. It may also make the user feel annoyed even if the incoming alert information is provided through a message or diagram superimposed on the screen image of the television the user is watching. Even in that case, however, the user's annoyance may be eased if such alert information is given when a TV commercial is on the air, not when a main program is on the air. Therefore, as noted above, it is preferable that the incoming to the mobile phone is informed to the user in a different mode based on the broadcasting discrimination command.

BRIEF DESCRIPTION OF THE DRAWINGS

Further features and advantages will be apparent from the detailed description of the invention described hereinafter in reference to the accompanying drawings in which.

DETAILED DESCRIPTION OF THE INVENTION

A preferred embodiment of the present invention will be described hereinafter in reference to the accompanying drawings.

Figure 1:
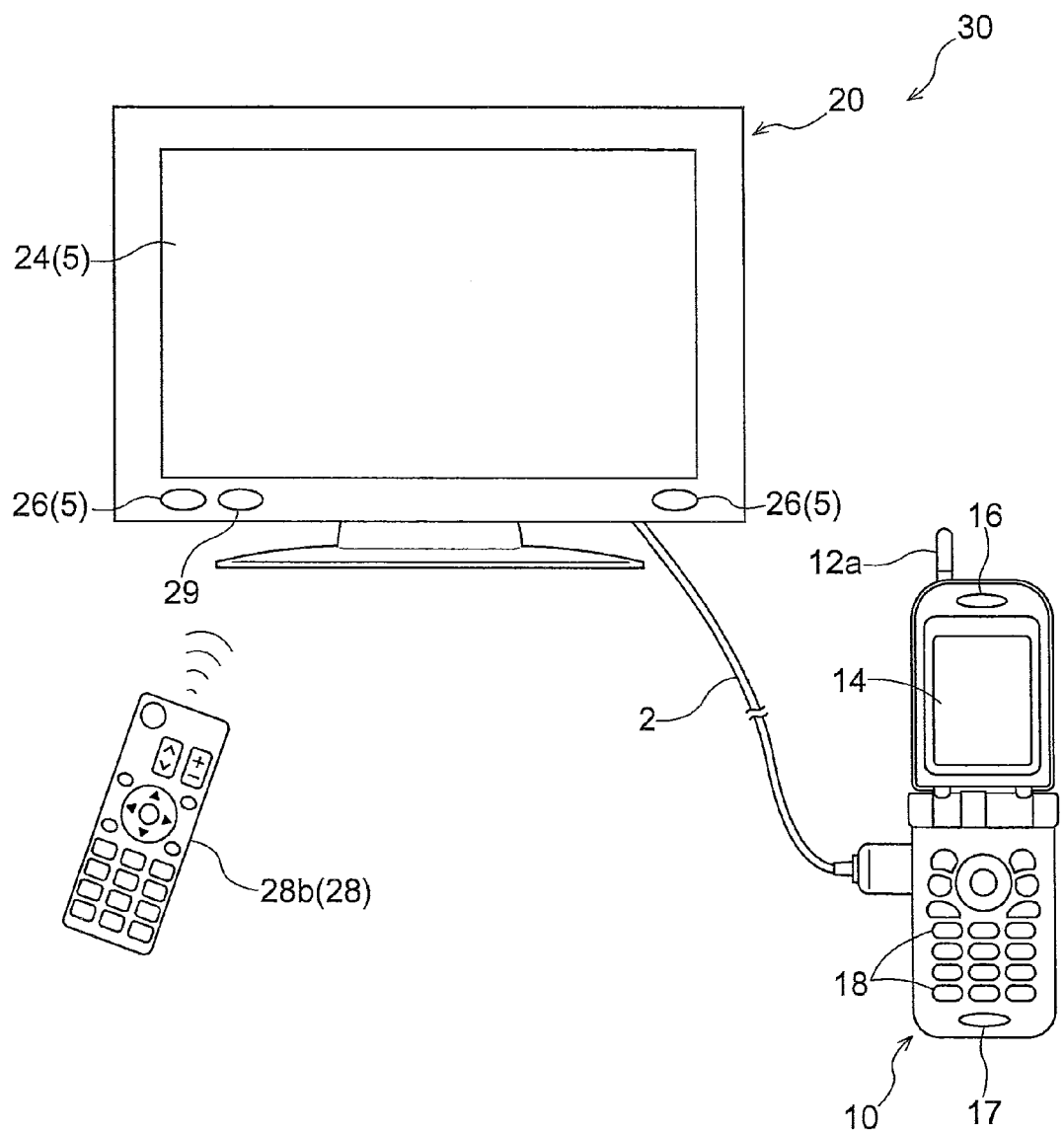
FIG. 1 is a schematic view of an incoming alert system in accordance with the present invention.
Figure 2:
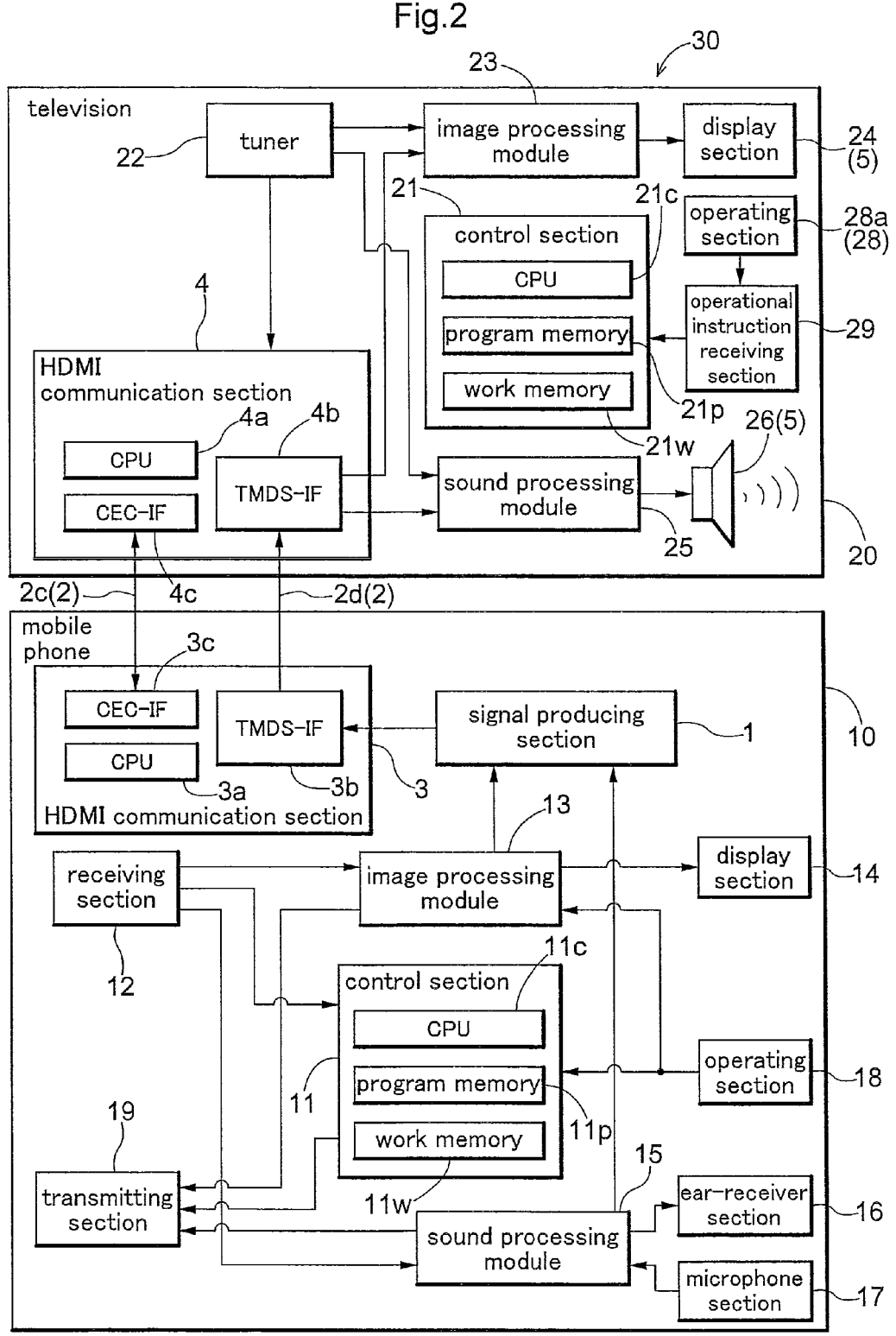
FIG. 2 is a block diagram schematically showing the incoming alert system in accordance with the present invention.

As shown in FIGS. 1 and 2, a mobile phone 10 relating to the preferred embodiment of the present invention comprises, as functional sections, a control section 11, a receiving section 12, an image processing module 13, a display section 14, an sound processing module 15, an ear-receiver section 16, a microphone section 17, an operating section 18, and a transmitter section 19. The mobile phone 10 further comprises an HDMI communication section 3, and a signal producing section 1. Those functional sections are achieved by hardware and the cooperation between hardware and software, and not necessarily clearly distinguished from one another as independent parts.

The control section 11 functions to control the respective functional sections of the mobile phone 10. In the current embodiment, the control section 11 includes a CPU (Central Processing Unit) 11c acting as a nucleus and cooperates with program memory 11p and work memory 11w. The CPU 11c, program memory 11p, and work memory 11w may be integrated in a single microprocessor or may be formed as a plurality of parts. As well known, numeral other electronic parts are built in the mobile phone 10, though not shown in the drawings. It should be noted that FIG. 2 mainly describes lines for sending and receiving data, and omits lines showing objects to be controlled.

The receiving section 12 functions to receive a call signal to the mobile phone 10, a sound signal (audio signal) of voice communication and a data signal of data communication, for example, through an antenna 12a. More particularly, the mobile phone 10 has a sound receiving function (voice communication function) for receiving a sound signal such as telephonic communication sound transmitted or relayed from an external signal transmitting device (other telephones or wireless base stations) through the antenna 12a and the receiving section 12, and then outputting audio information based on the received sound signal from an ear-receiver section 16 having a speaker through an sound processing module 15. The mobile phone 10 also has an electronic mail receiving function (E-mailing function) for receiving a radio signal for transmitting electronic mail information transmitted or relayed from the external signal transmitting device through the antenna 12a and the receiving section 12, and then displaying an image of the electronic mail information based on the received signal on a display section 14 through an image processing module 13.

It should be noted that the "electronic mail" in this context is not limited to e-mail exchanged in the Internet using the UUCP/SMTP protocol but also includes a text message or a short massage using an SMS (Short Message Service) provided by a communication common carrier. It also should be noted that the "electronic mail information" in this context includes not only text information but also image information or positional information.

In contrast, the transmitter section 19 functions to send a call signal, a sound signal (audio signal) and a data signal, for example, through the antenna 12a. More particularly, the mobile phone 10 has a sound transmitting function (voice communication function) for sending telephonic communication sound of the user uttered toward the microphone section 17 as a sound signal to an external signal receiving device (other telephones or wireless base stations) through the sound processing module 15. The mobile phone 10 also has an electronic mail transmitting function (E-mailing function) for sending a radio signal for transmitting the electronic mail information produced by the user to the external signal receiving device through the antenna 12a. The user inputs the information into an electronic circuit built in the mobile phone 10 by operating an operating section 18 having a plurality of keys to produce a message. An image representing the information on the message the user is working on is displayed on the display section 14 so that the user may input the information while checking the image of the message on which he or she is working.

The image processing module 13 acts as a nucleus of a GUI (Graphic User Interface) of the mobile phone 10 and functions to display a guidance screen for operating the mobile phone 10 on the display section 14 such as an address book, a function list and an inputted phone number, for example. When the mobile phone 10 has a camera function, the image processing module 13 functions to display a picture image on the display section 14 that is being taken or display data of a picture image that has been taken. When the mobile phone 10 has a sound reproduction function or recording function, the sound processing module 15 functions to reproduce music or sound through the speaker such as the ear-receiver section 16 and to store sound picked up through the microphone section 17, for example, in a storage section such as memory.

As shown in FIGS. 1 and 2, a television (television receiver) 20 comprises a control section 21, a tuner 22, an image processing module 23, a display section 24, an sound processing module 25, a speaker 26, an operating section 28, and an operational instruction receiving section 29. The television 20 further comprises an HDMI communication section 4. Those functional sections are achieved by hardware and the cooperation between hardware and software, and not necessarily clearly distinguished from one another as independent parts. In a similar way to the mobile phone 10, numeral other electronic parts are built in the television 20, though not shown in the drawings. It should be noted that the television 20 corresponds to the external device of the present invention. It also should be noted that the television 20 is not limited to a single-function television receiver. The television 20 includes a personal computer with a television function built as a single device integrated with a television, and an HDMI-enabled monitor device. The monitor device includes a projector.

The control section 21 functions to control the respective functional sections of the television 20. In the current embodiment, the control section 21 includes a CPU (Central Processing Unit) 21c acting as a nucleus and functions to cooperate with program memory 21p and work memory 21w. Those may be integrated in a single microprocessor or may be formed as a plurality of parts. As well known, numeral other electronic parts are built in the television 20. It should be noted that FIG. 2 mainly describes lines for sending and receiving data, and omits lines showing objects to be controlled.

The television 20 is capable of receiving a plurality of broadcasting channel signals through an unillustrated antenna or coaxial cable. The tuner 22 selects a specified broadcasting channel signal from the plurality of receivable broadcasting channel signals in response to the user's instruction. The image processing module 23 displays an image on the display section 24 based on the selected broadcasting channel signal. Concurrently, the sound processing module 25 outputs sound from the speaker 26 based on the selected broadcasting channel signal. The user designates a desired broadcasting channel using an instruction input section 28 such as buttons of an operating section 28 provided in a main body of the television 20 or keys of a remote controller 28b. The operational instruction receiving section 29 receives the instruction given to the instruction input section 28 and transmits it to the respective functional sections. The operational instruction receiving section 29 may include an infrared receiving section for receiving infrared communication data transmitted from the remote controller 28b, for example. The instruction input section 28 is also capable of giving instructions on the volume, screen switching and screen splitting, for example, and such instructions are transmitted to the sound processing module 25 and the image processing module 23. For the purpose of simplification, FIG. 2 only shows the relationships with the control section 21.

As shown in FIG. 1, the mobile phone 10 and the television 20 are connected to each other through a signal cable 2 acting as a signal transmitting medium. The signal cable 2 conforms to the HDMI standards and includes a TMDS signal transmitting line 2d and a CEC signal transmitting line 2c. A system 30 comprising the mobile phone 10 and the television 20 connected to each other through the signal cable 2 conforming to the HDMI standards corresponds to an incoming alert system of the present invention. The TMDS signal transmitting line 2d of the signal cable 2 is capable of transmitting an image signal and an audio signal unidirectionally only. The image signal and the audio signal are transmitted by a baseband transmission system through the TMDS signal transmitting line without being encoded (compressed). In the current embodiment, the image signal and the audio signal are transmitted from the mobile phone 10 to the television 20. The CEC signal transmitting line 2c of the signal cable 2 acts as the signal transmitting medium that is capable of transmitting control-type information such as commands bidirectionally. As described later, the mobile phone 10 and the television 20 achieve bidirectional communication of a CEC signal through the CEC signal transmitting line 2c to send and receive information with each other for controlling the television 20.

As shown in FIG. 2, the mobile phone 10 and the television 20 include the HDMI communication sections 3 and 4, respectively. Each of the HDMI communication sections 3 and 4 has a CPU 3a or 4a, a TMDS-IF 3b or 4b, and a CEC-IF 3c or 4c. The CEC-IF 3c or 4c is an interface for mutually sending and receiving a control-type CEC signal. The TMDS-IF 4b of the television 20 is an interface for receiving a TMDS signal representing an image signal and an audio signal. The TMDS-IF 3b of the mobile phone 10 is an interface for outputting a TMDS signal representing an image signal and audio signal. Thus, the mobile phone 10 is provided with the signal producing section 1 for converting a screen image or sound received from the image processing module 13 or the sound processing module 15 to a mode (TMDS signal) to be outputted to the television 20.

Figure 3:
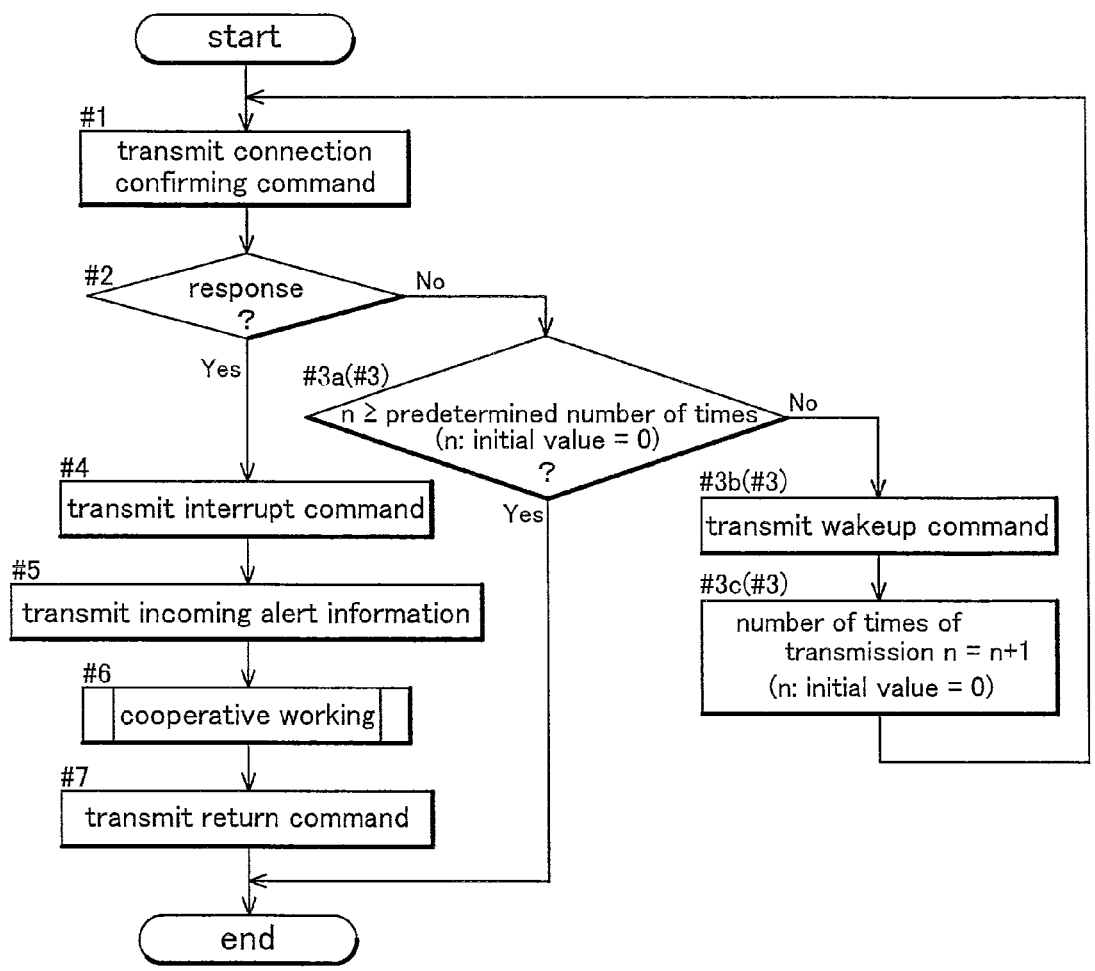
FIG. 3 is a flowchart showing a process of informing the user of incoming.

The process for informing the user of an incoming call or electronic mail will be described hereinafter in reference to the flowchart of FIG. 3 as well. When the mobile phone 10 receives a telephone call or electronic mail, the receiving section 12 transmits the information to the control section 11 that the telephone call or electronic mail has come in. The control section 11 that has been informed of the incoming call or electronic mail commences the implementation of an incoming alert program. FIG. 3 schematically shows the incoming alert program. The HDMI communication section 3 of the mobile phone 10 transmits a connection confirming command to the television 2 in accordance with the incoming alert program (connection confirming step: #1). More particularly, the connection confirming command is transmitted to the CEC-IF 4c of the HDMI communication section 4 from the CEC-IF 3c through the CEC signal transmitting line 2c by control at the CPU 3a of the communication section 3.

When the power of the television 20 is on and the connection confirming command is properly received at the CEC-IF 4c of the HDMI communication section 4 of the television 20, a response signal is transmitted from the television 20 to the mobile phone 10. More particularly, the response signal containing EDID (Extended Display Information Data) information is transmitted to the CEC-IF 3c of the HDMI communication section 3 from the CEC-IF 4c through the CEC signal transmitting line 2c by control at the CPU 4a of the HDMI communication section 3 (response step). The EDID information indicates a display mode compatible with a monitor of the television 20 such as the display section 24, and contains information on the valid number of pixels (display resolution, the number of pixels in width and height directions), a corresponding refresh rate (60 Hz, for example), and a color depth (16 bits, for example).

The control section 11 of the mobile phone 10 determines if a response has been received from the television 20 (response confirming step: #2). If there has been no response, a wakeup command is transmitted to the television 20 through the HDMI communication section 3 of the mobile phone 10 since the power of the television 20 might be off (startup step: #3). The control section 11 make the program return to step #1 to resend the connection confirming command after the lapse of a predetermined period of waiting time that is considered necessary for the television 20 to start up after the wakeup command has been transmitted. In this, the control section 11 makes the program return to step #1 to resend the connection confirmation command only when the wakeup command is transmitted less than a predetermined number of times. When there is no response even after the wakeup command is transmitted the predetermined number of times, the incoming alert program is terminated since the main power of the television 20 might be off or might not be connected to a power cable.

More particularly, as shown in FIG. 3, it is determined if the wakeup command is transmitted the predetermined number of times (n) or more at the beginning of the startup step #3 (#3a). If the number of times of transmission is (n) or more, the incoming alert program is terminated. If the number of times of transmission is less than (n), the wakeup command is transmitted (#3b), and the number of times of transmission (n) is incremented. The initial value of the number of times of transmission is zero and initialized in time of starting up the incoming alert program.

On the other hand, when it is determined that a response is received at the response confirming step #2, an interrupt command is transmitted to the television 20 (interrupt step: #4). During this time, that is, while the response confirming step #2 and the interrupt step #4 are executed at the control section 11, incoming alert information is produced at the signal producing section 1 in cooperation with the image processing module 13 and the sound processing module 15 based on the information received by the receiving section 12. In this, the signal producing section 1 produces the incoming alert information making use of the EDID information received by the HDMI communication section 3. The produced information is transmitted to the TMDS-IF 4b of the television 20 as an incoming alert information signal through the TMDS-IF 3b of the HDMI communication section 3 (incoming alert information transmitting step: #5). The mobile phone 10 is able to output a signal of proper resolution by making use of the EDID information. Thus, there is no need to incorporate any special software into the television 20. In other words, the incoming alert system 30 to cooperate with the general television 20 may be built up only if the incoming alert function is incorporated into the mobile phone 10.

The incoming alert information contains literal information or diagrammatic information superimposed on the display section 24 of the television 20, for example, and preferably contains a message or diagram for informing the user of the incoming call or electronic mail, and a source telephone number or source texting address. When the user has registered telephone numbers or texting addresses in an unillustrated database of the mobile phone 10, the incoming alert information may contain the name of a holder of the registered telephone numbers or texting addresses. When the user of the mobile phone 10 sets an icon or ringtone for identifying the source, such an icon may be displayed or such a ringtone may be gone off. By identifying the source, the user is able to deal with the incoming call or electronic mail taking urgency or importance into account. It should be noted that the incoming alert information may be superimposed on the display of the television 20 or replaced with a screen image displayed on the display section 24. Further, the way of informing is not limited to use of the display section 24 of the television 20, but the user may be alerted by the ringtone as noted above, for example, making use of the speaker 26 of the television 20. Both the display section 24 and the speaker 26 may function as an alerting section 5 of the present invention.

For instance, it is preferable that the response signal transmitted from the television 20 to the mobile phone 10 at the response step contains a broadcasting discrimination command for indicating whether the broadcasting on the television 10 is a main program or commercial. The mobile phone 10 is capable of transmitting a signal in a different mode at the interrupt step #4 or the incoming alert information transmitting step #5 based on the broadcasting discrimination command. For example, the interrupt command transmitted at the interrupt step #4 may be distinguished between the interrupt command using the entire screen of the television 20 and the interrupt command using only part of the screen, upper part or lower part, of the television 20. It is also possible to select between a mode for switching the display of the television 20 and a mode for superimposing the incoming alert information on the display of the television 20. Depending on the selected mode, the incoming alert information signal produced for transmission may also be varied.

In addition, after the incoming alert information is provided by the alerting section 5 of the television 20, the display section 24 of the television 20 may be substituted by the display section 14 of the mobile phone 10, or the speaker 26 of the television 20 may be substituted by the ear-receiver section 16 of the mobile phone 10. That is, cooperative workings may be executed by exchanging the CEC signals between the mobile phone 10 and the television 20 (cooperative working step: #6). For example, it is possible to display an incoming electronic mail on the display section 24 of the television 20 making use of the remote controller 28b of the television 20, or to reproduce a voice message in a voicemail service through the speaker 26 of the television 20. In addition, an HD (high definition) motion video may be associated with alerting of the incoming call or electronic mail with the content protection being given.

With respect to the cooperative working, an operational instruction from the user is received at the operational instruction receiving section 29 through the remote controller 28b or the operating section 28a provided in the main body of the television 20, and then transmitted to the HDMI communication section 4 of the television 20 through the control section 21 of the television 20. The CPU 4a of the HDMI communication section 4 makes the program to transmit the operational instruction from the user received through the operational instruction receiving section 29 to the mobile phone 10 through the CEC-IF 4c. The HDMI communication section 3 of the mobile phone 10 that has received the operational instruction as the CEC command transmits the instruction to the control section 11 of the mobile phone 10. The control section 11 of the mobile phone 10 controls the image processing module 13, sound processing module 15 and signal producing section 1 based on the user's operational instruction, and then transmits the data to the television 20 through the TMDS-IF 3b.

As a matter of course, such cooperative workings are not necessarily required, and the incoming alert program may simply give the user the incoming alert only. The control section 11 makes the program to transmit a return command through the CEC-IF 3c (return step: #7) after giving the incoming alert (or after executing the cooperative working step #6 at need). This allows the television 20 to return to the state before the interrupt by the mobile phone 10 occurs. For instance, when the power of the television 20 has been off, the power is turned off again by the return command.

The return command may not be a specified command, and may be selected based on a course of implementation of the incoming alert program, e.g. a result of bidirectional communication in the response step #2 or startup step #3. More particularly, when there is a prompt response to the connection confirming command transmitted at the connection confirming step #1, a command for simply opening the display section 24 of the television 20 may be transmitted as the return command. On the other hand, when a response to the connection confirming command is not received promptly but received after going through the startup step #3, not only the command for opening the display section 24 of the television 20 but also the command for turning off the power of the television 20 may be transmitted. As a matter of course, even when the response is received through the startup step #3, the command for simply opening the display section 24 of the television 20 may be transmitted as the return command without turning off the power of the television 20.

The incoming object to the mobile phone 10 to be informed may be all of the incoming calls or electronic mail, or may be only the incoming calls or electronic mail from a source designated and registered in the mobile phone 10. If such source registration is set as one of the standard registration items in the address book, for example, the user may easily perform the registration operation while the convenience is enhanced as well. Further, the object to be informed is not limited to the voice communication and electronic mail, but may include a pay content the user receives periodically at the mobile phone 10 or advertising distributed with a free content, e.g., corporate advertising and movie or music promos. If they are video contents in HD format, the effectiveness of distribution can be enhanced by displaying them on the television 20 having a larger monitor than the mobile phone 10.

The present invention may be applied to the mobile phone having the function of informing the user of the incoming to the mobile phone through the external device. The present invention may also be applied to the incoming alert system for informing the user of the incoming to the mobile phone. The present invention may further be applied to a content distributing business for distributing video contents.

DESCRIPTION OF REFERENCE NUMBERS 1 signal producing section
2 signal transmitting medium
3 HDMI communication section
5 alerting section
10 mobile phone
20 television (external device)
28 remote controller
29 operational instruction receiving section
30 incoming alerting system

What is claimed is:

1. A mobile phone comprising:
a signal producing section for producing an incoming information signal containing information for informing the user of the incoming information signal to the mobile phone in conformity to High-Definition Multimedia Interface (HDMI) standards when at least one of voice communication and data communication is received; and
an HDMI communication section for communicating with a television capable of performing signal transmission conformed to the HDMI standards through a signal transmission medium conformed to the HDMI standards and outputting the incoming information signal to the television,
wherein the HDMI communication section transmits a wakeup command for starting up the television in transmitting the incoming alert information signal when there is no response from the television within a predetermined period of time, and
the HDMI communication section transmits a command for informing the user of the incoming information signal to the mobile phone in a different mode based on a broadcasting discrimination command sent from the television for indicating at least whether the broadcasting on the television is a main program or commercial.

2. An incoming alert system including a mobile phone and a television connected to each other through a signal transmission medium, the system comprising:
a signal producing section provided in the mobile phone for producing an incoming information signal containing information for informing the user of the incoming information signal to the mobile phone in conformity to High-Definition Multimedia Interface (HDMI) standards when at least one of voice communication and data communication is received;
a phone-side HDMI communication section provided in the mobile phone for performing bidirectional communication of a Consumer Electronics Control (CEC) signal with the television through the signal transmission medium and outputting the incoming information signal to the television as a Transition-Minimized Differential Signaling (TMDS) signal;
a television-side HDMI communication section provided in the television for performing bidirectional communication of the CEC signal with the mobile phone through the signal transmission medium and receiving the incoming information signal; and
an alerting section provided in the television for alerting the user to the incoming information signal to the mobile phone based on the incoming alert information signal through at least one of a visual alert and an auditory alert,
wherein the phone-side HDMI communication section transmits a wakeup command for starting up the television in transmitting the incoming alert information signal when there is no response from the television within a predetermined period of time, and
the television-side HDMI communication section transmits a broadcasting discrimination command for indicating at least whether the broadcasting on the television is a main program or commercial, and
the phone-side HDMI communication section transmits a command for informing the user of the incoming information signal to the mobile phone in a different mode based on the broadcasting discrimination command.

3. The incoming alert system as claimed in claim 2, wherein, after transmitting the incoming information signal and informing the user of the incoming information signal to the mobile phone through the television, the phone-side HDMI communication section transmits a return command for returning the television to the state before the incoming information signal is transmitted.

4. The incoming alert system as claimed in claim 2, wherein the television includes an operational instruction receiving section for receiving an operational instruction including an instruction from a remote controller for the television controllable by the user,
the television-side HDMI communication section transmits a message demanding command for demanding transmission of details of the incoming information signal to the mobile phone based on the operational instruction, and
the phone-side HDMI communication section transmits the details of the incoming information signal to the mobile phone to the television.

5. The incoming alert system as claimed in claim 3, wherein the television includes an operational instruction receiving section for receiving an operational instruction including an instruction from a remote controller for the television controllable by the user,
the television-side HDMI communication section transmits a message demanding command for demanding transmission of details of the incoming information signal to the mobile phone based on the operational instruction, and
the phone-side HDMI communication section transmits the details of the incoming information signal to the mobile phone to the television.

* * * * *